(12) United States Patent
Elbaz et al.

(10) Patent No.: US 8,078,633 B2
(45) Date of Patent: Dec. 13, 2011

(54) METHODS AND SYSTEMS FOR IMPROVING TEXT SEGMENTATION

(75) Inventors: Gilad Israel Elbaz, Santa Monica, CA (US); Jacob L. Mandelson, Pasadena, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/724,344

(22) Filed: Mar. 15, 2010

(65) Prior Publication Data

US 2010/0174716 A1    Jul. 8, 2010

Related U.S. Application Data

(63) Continuation of application No. 10/955,281, filed on Sep. 30, 2004, now Pat. No. 7,680,648.

(51) Int. Cl.
*G06F 17/30* (2006.01)
(52) U.S. Cl. ......... 707/771; 707/708; 707/750; 707/755
(58) Field of Classification Search .................. None
See application file for complete search history.

(56) References Cited

U.S. PATENT DOCUMENTS

| | | | |
|---|---|---|---|
| 4,839,853 A | 6/1989 | Deerwester et al. | |
| 5,325,298 A | 6/1994 | Gallant | |
| 5,423,032 A | 6/1995 | Byrd et al. | |
| 5,454,046 A * | 9/1995 | Carman, II | 382/186 |
| 5,499,360 A | 3/1996 | Barbara et al. | |
| 5,619,709 A | 4/1997 | Caid et al. | |
| 5,778,363 A | 7/1998 | Light | |
| 5,778,364 A | 7/1998 | Nelson | |
| 5,845,278 A | 12/1998 | Kirsch et al. | |
| 5,890,103 A | 3/1999 | Carus | |
| 5,933,822 A | 8/1999 | Braden-Harder et al. | |
| 5,966,686 A | 10/1999 | Heidorn et al. | |
| 6,006,222 A | 12/1999 | Culliss | |
| 6,014,665 A | 1/2000 | Cullis | |
| 6,044,375 A | 3/2000 | Shmueli et al. | |
| 6,067,552 A | 5/2000 | Yu | |
| 6,076,051 A | 6/2000 | Messerly et al. | |
| 6,078,916 A | 6/2000 | Culliss | |

(Continued)

FOREIGN PATENT DOCUMENTS

EP    0621542 B1    10/1994

(Continued)

OTHER PUBLICATIONS

Wang, Zhongjian et al.,"A Word Segmentation Method With Dynamic Adapting to Text Using Inductive Learning", Association for Computational Linguistics, 2002, pp. 1-5.*

(Continued)

*Primary Examiner* — Apu Mofiz
*Assistant Examiner* — Hung D Le
(74) *Attorney, Agent, or Firm* — Fish & Richardson P.C.

(57) ABSTRACT

Methods and systems for improving text segmentation are disclosed. In one embodiment, at least a first segmented result and a second segmented result are determined from a string of characters, a first frequency of occurrence for the first segmented result and a second frequency of occurrence for the second segmented result are determined, and an operable segmented result is identified from the first segmented result and the second segmented result based at least in part on the first frequency of occurrence and the second frequency of occurrence.

20 Claims, 2 Drawing Sheets

U.S. PATENT DOCUMENTS

| | | | |
|---|---|---|---|
| 6,119,164 | A | 9/2000 | Basche |
| 6,134,532 | A | 10/2000 | Lazarus et al. |
| 6,178,419 | B1 | 1/2001 | Legh-Smith |
| 6,182,068 | B1 | 1/2001 | Culliss |
| 6,185,559 | B1 | 2/2001 | Brin et al. |
| 6,230,168 | B1 | 5/2001 | Unger et al. |
| 6,233,575 | B1 | 5/2001 | Agrawal et al. |
| 6,269,189 | B1 | 7/2001 | Chanod |
| 6,269,361 | B1 | 7/2001 | Davis et al. |
| 6,272,456 | B1 | 8/2001 | de Campos |
| 6,285,999 | B1 | 9/2001 | Page |
| 6,289,342 | B1 | 9/2001 | Lawrence |
| 6,289,353 | B1 | 9/2001 | Hazlehurst et al. |
| 6,298,348 | B1 | 10/2001 | Eldering |
| 6,314,419 | B1 | 11/2001 | Faisal |
| 6,324,519 | B1 | 11/2001 | Eldering |
| 6,334,131 | B2 | 12/2001 | Chakrabarti et al. |
| 6,421,675 | B1 | 7/2002 | Ryan et al. |
| 6,453,315 | B1 | 9/2002 | Weissman et al. |
| 6,493,702 | B1 | 12/2002 | Adar et al. |
| 6,526,440 | B1 | 2/2003 | Bharat |
| 6,529,903 | B2 | 3/2003 | Smith et al. |
| 6,542,401 | B2 | 4/2003 | Yamauchi et al. |
| 6,615,209 | B1 | 9/2003 | Gomes et al. |
| 6,640,006 | B2 * | 10/2003 | Wu et al. ............. 382/177 |
| 6,658,423 | B1 | 12/2003 | Pugh et al. |
| 6,678,409 | B1 * | 1/2004 | Wu et al. ............. 382/177 |
| 6,678,681 | B1 | 1/2004 | Brin |
| 6,714,939 | B2 | 3/2004 | Saldanha et al. |
| 6,725,259 | B1 | 4/2004 | Bharat |
| 6,738,764 | B2 | 5/2004 | Mao et al. |
| 6,754,873 | B1 | 6/2004 | Law et al. |
| 6,766,320 | B1 | 7/2004 | Wang et al. |
| 6,810,375 | B1 | 10/2004 | Ejerhed |
| 6,816,857 | B1 | 11/2004 | Weissman et al. |
| 6,826,559 | B1 | 11/2004 | Ponte |
| 6,910,003 | B1 | 6/2005 | Arnold et al. |
| 6,968,308 | B1 | 11/2005 | Brockett et al. |
| 7,107,218 | B1 | 9/2006 | Preston |
| 7,409,334 | B1 | 8/2008 | Shoemaker |
| 7,698,341 | B2 * | 4/2010 | Rubendall ............. 707/755 |
| 7,747,633 | B2 * | 6/2010 | Kadiyska et al. ......... 707/755 |
| 7,761,458 | B1 * | 7/2010 | Eshghi et al. ........... 707/755 |
| 7,792,814 | B2 * | 9/2010 | Cohen ................. 707/707 |
| 2002/0002450 | A1 | 1/2002 | Nunberg et al. |
| 2002/0002452 | A1 | 1/2002 | Christy et al. |
| 2002/0042791 | A1 | 4/2002 | Smith et al. |
| 2002/0059221 | A1 | 5/2002 | Whitehead et al. |
| 2002/0099700 | A1 | 7/2002 | Li |
| 2002/0123988 | A1 | 9/2002 | Dean et al. |
| 2002/0133481 | A1 | 9/2002 | Smith et al. |
| 2002/0165849 | A1 | 11/2002 | Singh et al. |
| 2003/0126235 | A1 | 7/2003 | Chandrasekar et al. |
| 2004/0059708 | A1 | 3/2004 | Dean et al. |
| 2004/0119740 | A1 | 6/2004 | Chang et al. |
| 2004/0122811 | A1 | 6/2004 | Page |
| 2005/0086065 | A1 | 4/2005 | Maion et al. |
| 2005/0086205 | A1 * | 4/2005 | Franciosa et al. ........... 707/3 |
| 2005/0131872 | A1 | 6/2005 | Calbucci et al. |
| 2005/0228797 | A1 | 10/2005 | Koningstein et al. |
| 2005/0283473 | A1 | 12/2005 | Rousso et al. |
| 2007/0118356 | A1 | 5/2007 | Badino |
| 2008/0059607 | A1 | 3/2008 | Schneider |

FOREIGN PATENT DOCUMENTS

| | | |
|---|---|---|
| EP | 1 014 276 | 6/2000 |
| EP | 1160686 | 12/2001 |
| WO | WO 00/079436 | 12/2000 |

OTHER PUBLICATIONS

U.S. Appl. No. 10/726,483.

U.S. Appl. No. 60/507,617, filed Sep. 30, 2003, Acharya, et al.

A9.com>Company>What's New & Cool [retrieved from the internet] http://a9.com/-/company/whatsCool.jsp, [retrieved on Jul. 29, 2004].

Koivunen, et al. "An Annotea Bookmark Schema" [retrieved from the internet] http://www.w3.org/2003/07/Annotea/BookmarkSchema-200300707, [retrieved Sep. 28, 2003].

Kahan, et al. "Annotea: An Open RDF Infrastructure for Shared Web Annotations"[retrieved from the internet] http://www.w3.org/2001/Annotea/Papers/www10/annotea-www10html], [retrieved on Sep. 28, 2003].

Applied Semantics News Series, pp. 1-4, brochure, no date.

Applied Semantics, "Applied Semantics Launches Contextual Targeting Pay-For-Performance Ad Service Solution", [retrieved from the internet] http://www.appliedsemantics.com/ne/ne_pr_102102.html [retrieved Aug. 18, 2003].

Applied Semantics, Inc.—Press Release, Applied Semantics Launches News Series to Power Publishing, [retrieved from the internet] http://www.appliedsemantics.com/ne/ne_pr_081302.html [retrieved on Aug. 18, 2003].

Barrett, et al., "How to Personalize the Web", *Proceedings of the ACM Conference on Human Factors in Computing Systems*, (1997).

Barroso et al., "Web Search for a Planet: The Google Cluster Architecture", *IEEE Computer Society*, (2003), pp. 22-28.

Bharat, "SearchPad: Explicit Capture of Search Context to Support Web Search", [retrieved from the internet] http://www9.org/w9cdrom/173/173.html [retrieved on Sep. 28, 2003].

bk2site [retrieved from the internet] "Now any yahoo can be Yahoo!" http://bk2site.sourceforge.net/ [retrieved on Sep. 28, 2003].

BlinkPro: Powerful Bookmark Manager: [retrieved from the internet] http://www.blinkpro.com/, [retrieved on Sep. 28, 2003].

Bookmark Tracker.com [retrieved from the internet] http://www.bookmrktracker.com/, [retrieved on Sep. 28, 2003].

Brin, et al., "The Anatomy of a Large-Scale Hypertextual Web Search Engine",: 1998, Computer Science Department, Stanford University, Stanford, CA.

Chang, et al., "IEPAD: Information Extraction Based on Pattern Discovery", 2001, *Dept. of Computer Science and Information Engineering, National Central University*, Chung-Li, Taiwan.

Chi et al., "Context Query in Information Retrieval" Proceedings of the 14th IEEE International Conference on Tools with Artificial Intelligence, IEEE Comp. Soc. vol. Conf. Nov. 14, 2002, pp. 101-106.

CIRCA Technology Overview, Applied Semantics White Paper, Jul. 2001, pp. 1-10.

Convera—Products: Retrieval Ware, RetrievalWare—Optimized Search Precision & Recall [retrieved from the internet] http://www.convera.com/products/nw_precisions.asp [retrieved on Oct. 30, 2003].

Crescenzi, et al., "RoadRunner: Towards Automatic Date Extraction from Large Web Sites", *Proceedings of the 27th VLDB Conference*, 2001, Rome, Italy.

Czyowicz, et al., "Evaluation of Hotlinks Assignment Heuristics for Improving Web Access", Second Int'l Conference on Internet Computing (IC'01), vol. 2, Jun. 25-28, 2001, pp. 793-799, Las Vegas, Nevada, CSREA Press.

Delort, et al., "Enhanced Web Document Summarization Using Hyperlinks", Hypo Tube'03, Aug. 26-30, 2003, Nottingham, United Kingdom.

Denoue, et al., "An annotation tool for Web browsers and its applications to information retrieval", Syscom University de Savoie, France.

Fellbaum, WorldNet: An Electronic Lexical Database, Cambridge: *The MIT Press* (Mar. 1998).

Freitag, et al., "Boosted Wrapper Induction", *American Association for Artificial Intelligence*(2000).

FurlBeta What is Furl [retrieved from the internet] http://www.furl.net/leranMore.jsp [retrieved on Jul. 29, 2004].

Geller, "Quigo Signs Deal with Overture", *Media Daily News*, (Aug. 13, 2003) [retrieved from the internet] http://www.mediapost.com/dtis_dsp_news.cfm?NewsID=215196 [retrieved on Sep. 21, 2004].

Google, News Results for Search Engines, [retrieved from the internet] http://www.google.com/search?hl=en&ie.,=UTF-8&q=search+engines, [retrieved on Jul. 26, 2004].

Grefenstette, "Comparing Two Language Identification Schemes" International Conference on Statistical Analysis of Textual Data, Dec. 11, 1995.

Hsu, et al., "Generating Finite-State Transducers for Semi-Structured Data Extraction from the Web", Information Systems, 1998, pp. 521-538, vol. 23, No. 8, Elsevier Science Ltd., Great Britain.

iKeepBookmarks.com—A web-Based Bookmark Manager [retrieved from the internet] http://www.ikeepbookrnarks.com/ [retrieved on Sep. 28, 2003].

Kaasten, et al., "Designing an Integrated Bookmark/History System for Web Browsing", History Keeping in Computer Applications: A workshop, held at Human-Computer Interaction Laboratory, University of Maryland, Maryland, Dec. 3, 1999.

Kaasten, et al., "Designing an Integrated Bookmark/History System for Web Browsing", *Proceedings of the Western Computer Graphics Symposium*, Mar. 26-29, 2000.

Kaasten, et al., "How People Recognize Previously Seen WWW Pages from Tiles, URLs and Thumbnails" in X. Faulkner, J. Finlay, F. Detienne (Eds.) People and Computers XVI (Proceedings of Human Computer Interaction 2002) BCS Conference Series, 247-265, Spriger Verlag [retrieved from the internet] http://www.cpsc.ucalgary.ca/grouplab/papers/200202-ThumbnailStudy.BHCI/abstract.html, [retrieved on Jul. 29, 2004].

Kaasten, et al., "Integrating Back, History and Bookmarks in Web Browsers", In Extended Abstracts of the ACM Conference of Human Factors in Computing Systems (Chi'01), 2000.

Koll "Information Retrieval Theory and Design Based on a Model of the User's Concept Relations", Proceedings of the $3^{rd}$ Annual ACM Conference on Research and Development in Information Retrieval, 1980, pp. 77-93.

Kushmerick, et al., "Adaptive information extraction: Core technologies for information agents",: 2002, *Computer Sciences Debarment, University College Dublin*.

Kushmerick, "Wrapper induction: Efficiency and expressiveness" *Artificial Intelligence 118* (2000) 15-68.

Kushmerick, "Finite-state approaches to Web information extraction", 2002, *Computer Science Debarment, University College Dublin*.

Laender, et al., "A Brief Survey of Web Data Extraction Tools", 2002, *Department of Computer Science, Federal University of Minas Gerais, Belo Horizonte MG Brazil*.

Li, et al., "PowerBookmarks: A System for Personalizable Web Information Organization, Sharing and Management", Sigmod Conference 1999, pp. 565-567.

Maarek, et al., "Automatically Organizing Bookmarks per Contents", $5^{th}$ Int'l World Wide Web Conference, Paris, France, May 6-10, 1996 [retrieved from the internet] http://www.5conf.inria.fr/fich_html/ppaers/P37/Overview.html, [retrieved on Sep. 28, 2003].

Middleton, et al., "Capturing Knowledge of User Preferences: Ontologies in Recommender Systems", Proceeding of the $1^{st}$ Int'l Conference on Knowledge Capture (K-CAP), Oct. 2001.

Muslea, et al., "Hierarchical Wrapper Induction for Semistructured Information Sources" (Sep. 10, 1999) pp. 1-27, *Kluwer Academic Publishers*, the Netherlands.

Ontology Usage and Applications, Applied Semantics Technical White Paper, Jul. 2001, pp. 1-15.

Oztekin, et al., "Usage Meets Link Analysis: Towards Improving Site Specific and Intranet Search via Usage Statistics" Technical Report, Department of Computer Science and Engineering, University of Minnesota, May 24, 2004.

Applied Semantics AdSense "Powerful Revenue Solutions of Online Publishers" brochure, pp. 1-2, no date.

RSS 1.0 channel for bookmark sharing. from Dan Brickleyon on Jan. 29, 2001 [retrieved from the internet] http://lists.w3.org/Archives/Public/www-annotatin/2001Jan.Jun/0002.html, [retrieved on Sep. 28, 2003].

Save This Homepage Gourmet the Magazine for good Living [retrieved from the Internet] http://www.savethis.clickability.com/saveThisApp?clickMap=displayHelp&helpID=0 [retrieved on Sep. 28, 2003].

Staab, et al., "An Annotation Framework for the Semantic Web", Proceedings of the $1^{st}$ Int'l Workshop on Multimedia Annotation, Tokyo, Japan, Jan. 30-31, 2001.

Sullivan, "AlmondNet Debuts Post-Search Behavioral Ad Network" (Jan. 27, 2005) [retrieved from the internet] http://searchenginwatch.com/searchday/article.php/3464811 (retrieved on Feb. 10, 2005).

Tauscher et al., "Revisitation Patterns in World Wide Web Navigation", ACM SIGCHI '97, Proceedings of the Conference on Human Factors in Computing Systems, held in Atlanta, George, Mar. 22-27, ACM Press.

Tengi, "Design and Impementation of the WorldNet Lexical Database and Searching Software", in WorldNet: An electronic Lexical Data Base, Fellbaum, C. ed., Cambridge: The MIT Press 1998, 105-127.

Terveen, et al., "A System for Sharing Recommendations", *Communication of the ACM*, vol. 40, No. 3, (Mar. 1997).

TinyURL.com—where tiny is better: [retrieved from the internet] http://tinuURL.com, [retrieved on Nov. 11, 2003].

Shum, et al. "Verity Introduces Customizable Industry and Enterprise Taxonomies" ( Nov. 17, 2003), pp. 1-2.

Voorhees, "Query Expansion Using Lexical-Semantic Relations", Proceedings to the $17^{th}$ Annual ACM Conference on Research and Development in Information Retrieval, Aug. 1994, pp. 61-69.

Walker "Marking a New Tool for Surfers" [retrieved from the internet] http://www.washingtonpost.com/ac2/wp-dyn/A132-2000Sep13?languate=printer, [retrieved on Sep. 28, 2003].

White, et al., "Multidocument Summarization via Information Extraction", *First Int'l Conference on Human Language Technology Research (HLT)* (2001).

Wang et al., "A Word Segmentation Method with Dynamic Adapting to Text Using Inductive Learning," Association for Computational Linguistics, 2002, pp. 1-5.

ZNAIL—for easier living in a virtual world [retrieved from the internet] http://www.znail.com/, [retrieved on Sep. 28, 2003].

International Search Report & Written Opinion for Application No. PCT/US2005/035010, dated May 16, 2006, 15 pages.

\* cited by examiner

METHODS AND SYSTEMS FOR IMPROVING TEXT SEGMENTATION

CROSS-REFERENCE TO RELATED APPLICATIONS

This application is a continuation of U.S. patent application Ser. No. 10/955,281, to Elbaz, et al., entitled "Methods and Systems for Improving Text Segmentation" filed Sep. 30, 2004, the contents of which are incorporated herein by reference.

FIELD OF THE INVENTION

The present invention relates generally to text segmentation and, more particularly, to methods and systems for improving text segmentation.

BACKGROUND OF THE INVENTION

Text processing methods and systems exist that attempt to interpret data representing text. Text processing is made more difficult when text comprising a string of characters is received that has no breaks indicating words or other tokens. When processing such strings of characters using existing methods and systems, the characters can be segmented into tokens in order to interpret the string. Tokens can be words, acronyms, abbreviations, proper names, geographical names, stock market ticker symbols, or other tokens. Generally, a string of characters may be segmented into multiple combinations of segmented strings of characters using existing methods and systems.

SUMMARY

Embodiments of the present invention comprise methods and systems for improving text segmentation. One aspect of one embodiment of the present invention comprises determining at least a first segmented result and a second segmented result from a string of characters, determining a first frequency of occurrence for the first segmented result and a second frequency of occurrence for the second segmented result, and identifying an operable segmented result from the first segmented result and the second segmented result based at least in part on the first frequency of occurrence and the second frequency of occurrence. In one embodiment, identifying the operable segment from the first segment result and the second segment result based at least in part on the first frequency of occurrence and the second frequency of occurrence can comprise selecting the first segment result if the first frequency of occurrence is greater than the second frequency of occurrence.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for improving text segmentation. There are multiple embodiments of the present invention. By way of introduction and example, one exemplary embodiment of the present invention provides a method for improving segmenting a string of characters, such as a domain name, into multiple tokens or words. A string of characters often can be segmented into many segmented results. Each segmented result can be a particular combination of words or other tokens. For example, the string of characters "usedrugs" can be segmented into the following segmented results: "used rugs", "use drugs", "us ed rugs", etc. From this number of segmented results, an operable segmented result can be identified based on the number of documents or search queries that contain the operable segmented result.

For example, segmented results with the highest probability of being the best operable segmented result can be selected. A search engine can determine the number of documents or search queries containing a selected segmented result and can do this for each selected segmented result. In one embodiment, the segmented result that occurs in the greatest number of documents or search queries may be identified as the best or operable segmented result. The operable segmented result can be used for a variety of functions, including selecting advertisements based on the result or improving the filtering of search results containing the result.

This introduction is given to introduce the reader to the general subject matter of the application. By no means is the invention limited to such subject matter. Exemplary embodiments are described below.

System Architecture

Figure 1:
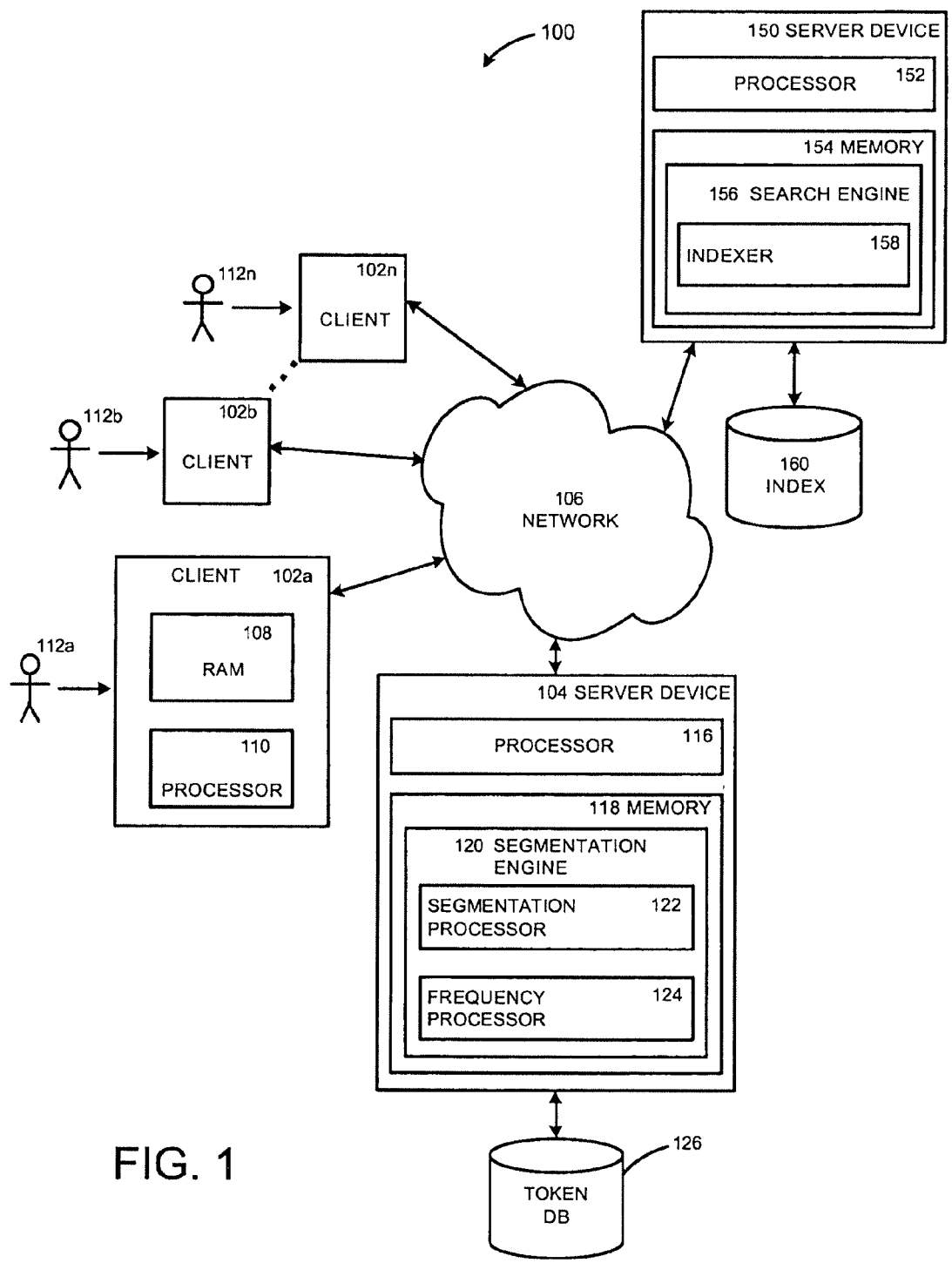
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 and a server device 150 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown in FIG. 1 each comprise a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable media may transmit instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 and a server device 150 are also coupled to the network 106.

The server device 104 can comprise a server executing a segmentation engine application program and server device 150 can comprise a server executing a search engine application program. Similar to the client devices 102a-n, the server device 104 and server device 150 shown in FIG. 1 comprise a processor 116 coupled to a computer-readable memory 118 and a processor 152 coupled to a computer-readable memory 154, respectively. Server devices 104 and 150, depicted as single computer systems, may be implemented as a network of computer processors. Examples of server devices 104, 150 are servers, mainframe computers, networked computers, a processor-based device, and similar types of systems and devices. Client processor 110 and the server processors 116, 152 can be any of a number of computer processors, as described above, such as processors from Intel Corporation of Santa Clara, Calif. and Motorola Corporation of Schaumburg, Ill.

Memory 118 contains a segmentation application program, also known as a segmentation engine 120. The server device 104, or related device, can access the network 106 to receive strings of characters from other devices or systems connected to the network 106. Characters can include, for example, marks or symbols used in a writing system, including data representing a character, such as ASCII, Unicode, ISO 8859-1, Shift JIS, and EBCDIC or any other suitable character set. In embodiment, the segmentation engine 120 can receive a string of characters, such as a domain name, from a server device on the network 106 when a user 112a attempts to direct a web browser application to a domain name that is not active.

In one embodiment, the segmentation engine 120 segments the string of characters into potential combinations of tokens and selects a particular combination to associate with the string of characters. A token can comprise a word, a proper name, a geographic name, an abbreviation, an acronym, a stock market ticker symbol, or other tokens. The segmentation engine 120 can include a segmentation processor 122 and a frequency processor 124. In the embodiment shown in FIG. 1, each comprises computer code residing in the memory 118.

The segmentation processor 122 can determine a list of potential combinations of tokens or segmented results from the string of characters. In one embodiment, the frequency processor 124 determines a probability for each segmented result in the list and selects the top segmented results based on the probability. The probability for a segmented result can be based on frequency values associated with the individual tokens in the result. In one embodiment, the unsegmented string of characters may be included as a segmented result.

The frequency processor 124 can perform a frequency search on the top-selected segmented results. The frequency processor 124 can include a spell-checking functionality or can call a spell-checking functionality residing elsewhere to perform a spell check on the selected segmented results. Any spell corrected results can be included in the frequency search. In one embodiment, the frequency processor sends the selected segmented results to the server device 150 to perform a frequency search on the selected segmented results. A frequency search can determine the number of occurrences for each particular segmented result as described below. Based on the frequency search a best or operable segmented result can be identified by the segmentation processor 122. In one embodiment, the operable segmented result can be sent to an advertising server that can select advertisements targeted based on the operable segmented result. Other functions and characteristics of the segmentation processor 122 and the frequency processor 124 are further described below.

Server device 104 also provides access to other storage elements, such as a token storage element, in the example shown a token database 120. The token database 120 can be used to store tokens and frequency information associated with each token. Data storage elements may include any one or combination of methods for storing data, including without limitation, arrays, hash tables, lists, and pairs. The server device 104 can access other similar types of data storage devices.

The server device 150 can include a server executing a search engine application program, such as the Google™ search engine. In other embodiments, the server device 150 can comprise a related information server or an advertising server. In another embodiment, there can be multiple server devices 150.

Memory 154 contains the search engine application program, also known as a search engine 156. The search engine 156 can locate relevant information from the network 106 in response to a search query from a user 112a and can maintain a search log of search queries. The search engine 156 can also perform a frequency search in response to a frequency search request from the frequency processor 124. The search engine 156 can provide a search result set to a user 112a or frequency information to the segmentation engine 120 via the network 106.

In one embodiment, the server device 150, or related device, has previously performed a crawl of the network 106 to locate articles, such as web pages, stored at other devices or systems coupled to the network 106. Articles include, for example, documents, emails, instant messenger messages, database entries, web pages of various formats, such as HTML, XML, XHTML, Portable Document Format (PDF) files, and media files, such as image files, audio files, and video files, or any other documents or groups of documents or information of any suitable type whatsoever. An indexer 158 can be used to index the articles in memory 154 or on another data storage device, such as an index 160. In one embodiment, there are multiple indexes each containing a portion of the total articles indexed. It should be appreciated that other suitable methods for indexing articles in lieu of or in combination with crawling may be used, such as manual submission.

The search engine 156 can perform a frequency search in a number of suitable ways. In one embodiment, the search engine 156 can perform a web search using the top selected segmented results as search queries. In this embodiment, a frequency search result set can be generated and can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article. The frequency processor 124 can use the number of article identifiers in each frequency search result set as a representation of the number of occurrences of the respective segmented result. In another embodiment, the frequency processor 124 can interface directly with the indexer 158. The indexer 158 can determine, for each top selected segmented result, the number of articles that the segmented result appears in. This information can be sent to the frequency processor 124 as a representation of the frequency of occurrence for each top selected segmented result. In still another embodiment, the search engine 156 and/or the frequency processor 124 can determine, for each selected segmented result, the number of occurrences in search queries from the search log and the frequency processor 124 can use this search log information as a representation of the frequency of occurrence.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain method illustrated in FIG. 2.

Process

Various methods in accordance with embodiments of the present invention may be carried out. One exemplary method according to the present invention comprises determining a first segmented result and a second segmented result from a string of characters, determining a first frequency of occurrence for the first segmented result and a second frequency of occurrence for the second segmented result, and identifying an operable segmented result from the first segmented result and the second segmented result based at least in part on the first frequency of occurrence and the second frequency of occurrence. More than two segmented results can be determined.

In one embodiment, identifying the operable segment from the first segment result and the second segment result based at least in part on the first frequency of occurrence and the second frequency of occurrence can comprise selecting the first segment result if the first frequency of occurrence is greater than the second frequency of occurrence. The sting of characters can comprise a domain name. The first segmented result can comprise a first combination of tokens and the second segmented result comprises a second combination of tokens. In one embodiment, the second segmented result can be a spelling corrected version of the first segmented result.

In one embodiment, determining the first frequency of occurrence for the first segmented result can comprise determining a number of articles containing the first segmented result and determining the number of articles containing the first segmented result can comprise determining a number of article identifiers in a search result set generated in response to a search query comprising the first segmented result.

In one embodiment, determining the number of articles containing the first segmented result can comprise accessing an index of articles. In another embodiment, determining the first frequency of occurrence for the first segmented result can comprise determining a number of occurrences of the first segmented result in a plurality of search queries.

The method may also comprise selecting an article based at least in part on the operable segmented result and the article can comprise an advertisement. In another embodiment, the method may also comprise determining whether to filter a domain name comprising the string of characters based at least in part on the operable segmented result.

In one embodiment, determining the first segmented result and the second segmented result comprises determining a plurality of segmented results from the string of characters, and identifying the first segmented result and the second segmented result from the plurality of segmented results. Identifying the first segmented result and the second segmented result can comprise calculating a probability value for each of the plurality of segmented results. A first probability value associated with the first segmented result can be based at least in part on a frequency of each token with the first segmented result.

Another exemplary method can comprise determining a plurality of segmented results from the string of characters, identifying a first segmented result and a second segmented result from the plurality of segmented results, generating a first search results set comprising a first number of article identifiers associated with the first segmented result and a second search results set comprising a second number of article identifiers associated with the second segmented result, and selecting the first segmented result when the first number of article identifiers is greater than the second number of article identifiers and selecting the second segmented result when the second number of article identifiers is greater than the first number of article identifiers. Generating the first search result set can comprise generating a first search query comprising the first segmented result and generating the second search result set can comprise generating a second search query comprising the second segmented result.

Another exemplary method can comprise determining a first segmented result and a second segmented result from a domain name, determining a first frequency of occurrence for the first segmented result in at least one of an article index, a text index, and a search result set, determining a second frequency of occurrence for the second segmented result, if the first frequency of occurrence is greater than the second frequency of occurrence, then selecting the first segmented result as an operable segmented result, if the second frequency of occurrence is greater than the first frequency of occurrence, then selecting the second segmented result as the operable segmented result, and selecting an advertisement based at least in part on the operable segmented result, wherein the advertisement includes text associated with the operable segmented result, and causing a display of the advertisement in association with a web page associated with the domain name.

Figure 2:
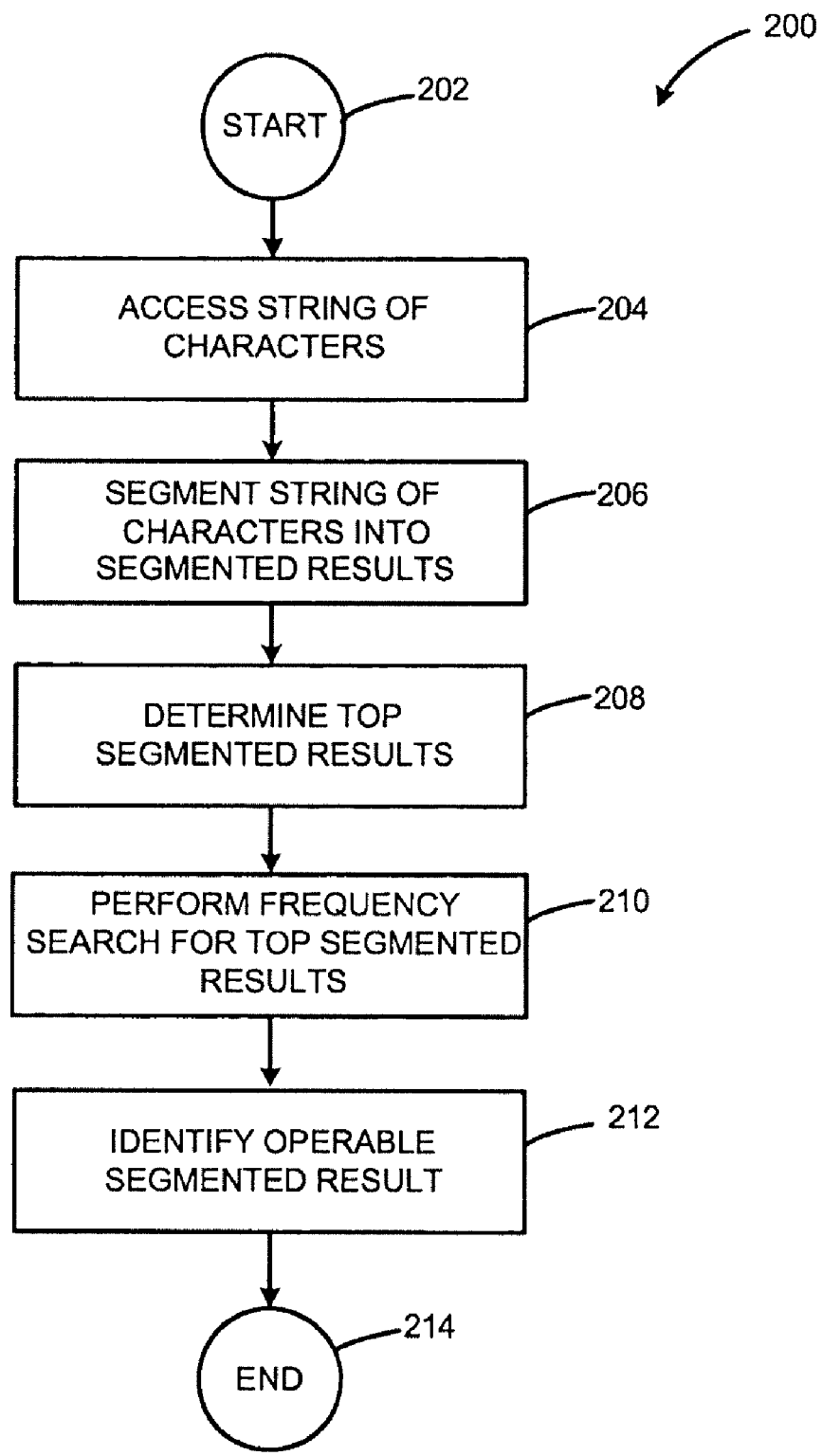
FIG. 2 illustrates a flow diagram of one embodiment of a method carried out by the present invention.

FIG. 2 illustrates an exemplary method 200 for improving text segmentation utilizing frequency of occurrence of segmented results, in accordance with one embodiment of the invention. This exemplary method is provided by way of example, as there are a variety of ways to carry out methods according to the present invention. The method 200 shown in FIG. 2 can be executed or otherwise performed by one or a combination of various systems. The method 200 is described below as carried out by the system 100 shown in FIG. 1 by way of example, and various elements of the system 100 are referenced in explaining the example method of FIG. 2.

Referring to FIG. 2, in block 202, the example method begins. Block 202 is followed by block 204, in which a string of characters can be accessed by the segmentation engine 120. A string of characters can be received or accessed from a device connected to network 106, for example, or from another device. In one embodiment, the string of characters can be a domain name associated with an inactive or nonexistent website received from an advertising server associated with the domain name.

Block 204 is followed by block 206, in which a plurality of segmented results is generated from the string of characters by segmenting the string of characters. Segmenting the string of characters may include parsing the characters in the string into a plurality of combinations of tokens and can be performed by the segmentation processor 122. The segmentation processor 122 can develop a list of segmentation results. Each segmented result can be a particular combination of tokens or a single token. For example, the string of characters "usedrugs" can be segmented into the segmented results including "used rugs", "use drugs", "us ed rugs", "u sed rugs", "use-drugs", etc. The unsegmented string of characters may also be included as a segmented result.

The segmentation processor 122 can utilize tokens from the token database 126 in the segmentation process. Various methods can be used to segment the string of characters, such as the segmentation techniques described in PCT International Patent Application No. PCT/US03141609 entitled "Methods and Systems for Text Segmentation" filed Dec. 30, 2003, which is hereby incorporated in its entirety by this reference.

Block 206 is followed by block 208, in which the top segmented results are determined. The top segmented results can be determined by the segmentation processor 122 and can be the results with the highest probability of being the best or operable segmented result. In one embodiment, the segmented results can be ranked based on a probability value determined for each segmented result. In one embodiment, a probability value can be determined at least in part by summing frequency values associated with the individual tokens within each individual segmented result. In another embodiment, a probability value can be determined by a complex function involving summing the logarithms of the frequency values associated with the individual tokens within each individual result. A number of the top ranking segmented results can then be selected. For example, the segmented results can be ranked and the top three results can be selected.

Block 208 is followed by block 210, in which a frequency search is performed for the top, selected segmented results. The frequency search can be performed by the frequency processor 124 in conjunction with the search engine 156. In one embodiment, the segmentation processor 122 can pass the selected segmented results to the frequency processor 124, which can determine the frequency of occurrence for each of the segmented results in a corpus of articles or search queries.

In one embodiment, the frequency processor 124 can determine the frequency of occurrence for the segmented results based on articles indexed by a search engine 156. In one embodiment, the frequency processor 124 can send the top selected segmented results to the search engine 156 via the network 106. The search engine 156 can perform a search for each of the segmented results in the indexed articles by using each segmented result as a search query. For example, the frequency processor 124 can send each segmented result surrounded by quotation marks to the search engine 156 as a search query, so that the search engine 156 performs the search on the exact segmented phrase. In one embodiment, for each segmented result, the search engine 156 can generate a search result set containing a number of article identifiers responsive to the search query. The search engine 156 can send the search result set for each of the segmented results back to the frequency processor 124 via the network 106. The frequency processor 124 can determine from each search result set, based on the number of article identifiers, the frequency with which each segmented result occurs.

In another embodiment, the frequency processor 124 can send the top, selected segmented results to the indexer 158 via the network 106. The indexer 158 can access the index 160 to determine the number of articles in which a segmented result occurs and can do this for each of the selected segmented results. In one embodiment, the index 160 may be multiple indexes and the indexer 158 can check a fraction of the total index for each segmented result. The indexer 158 can then pass the number of occurrences associated with each segmented result to the frequency processor 124 via the network 106.

In still another embodiment, the frequency processor 124 can send the top, selected segmented results to the search engine 156 via the network 106 to determine the number of occurrences of the segmented results in search queries. For example, the search engine 156 can, for each segmented result, determine the number of times that the segmented result was used by users as an actual search query or part of an actual search query from a search of the logs of search queries. The number of occurrences in search queries for each segmented result can be sent by the search engine 156 to the frequency processor 124 via the network 106.

For example, if the segmentation processor 122 determines that the selected segmented results for the string of characters "usedrugs" are "used rugs", "use drugs", and "us ed rugs", the frequency processor 124 can send these segmented results to the search engine 156. The search engine 156 can, for example, use these results as search queries and generate three search result sets. For example, the search engine 156 can use "used rugs" as a search query and determine a search result set—for the search query containing article identifiers associated with articles containing the phrase "used rugs". In another embodiment, the search engine 156 can determine, from associated search logs containing prior received search queries, the number of 16 times search queries containing the segmented results was received. For example, the search engine 156 can search its search logs for the number of times a search query containing the phrase "used rugs" was received. In still another embodiment, the indexer 158 of the search engine 156 can receive the search results and determine the number of articles in the index 160 or a portion of the index 160 containing the segmented results. For example, the indexer 158 can search through the index 160 or a portion of the index 160 for the number of articles containing "used rugs".

A spell-checking function can also be included in the frequency search. For example, the frequency processor 124 can include or can call a spell-checking function, so that the top, selected segmented results can be spell checked. The spell-checking function can determine correct or preferred spellings for the individual tokens in each segmented result. The frequency processor 124 can perform a frequency search on the top segmented results as well as any spelling-corrected segmented results to determine a frequency of occurrence for both results. For example, if a segmented result is "basebal game" and the spelling-corrected result is "baseball game", a frequency search can be performed for both of these results.

Block 210 is followed by block 212, in which the operable segmented result is identified. In one embodiment, the frequency processor 124 can identify the operable segmented result. For example, the frequency processor 124 can select the segmented result that has the highest associated frequency of occurrence. As explained above, the frequency of occurrence can be a value based on the number of articles or search queries containing the segmented result and the total number of articles or search queries. Additional signals can also be used to determine the operable segmented result. For example, the frequency processor 124 can take into account an objective ranking (such as the PageRank™ ranking algorithm for web articles) of the articles containing each segmented result and use the objective ranking to weigh the articles containing each segmented result. The number of times the segmented result occurs in an article and the location of the segmented result in the articles can also be used to weigh the articles containing a segmented result. In block 214, the method 200 ends.

The operable segmented result can be used in a variety of ways. The operable segmented result can be used in the selection of advertisements. For example, a user 112a may attempt to navigate his browser application to the website "usedrugs.com" by entering this string of characters into the browser application. If no such website exists at the domain name "usedrugs.com", the user's browser application may be redirected to a third-party website. The third-party website may desire to place advertisements and/or links relevant to the domain name entered by the user on a web page being viewed by the user. The third-party website can send the domain name "usedrugs.com" to the segmentation engine 120. The segmentation engine 120 can use the methods and systems described above to return an operable segmented result to the third party website or an advertising server associated with the website. For example, the operable segmented result can be "used rugs". The third-party website or advertising server can cause the display of advertisements and/or links relevant to the phrase "used rugs" on the web page being viewed by the user.

The operable segmented result can also be used to optimize content filters used during the generation of search results. For example, a domain name, such as "mikesexpress.com", can be filtered out of search results by an adult filter, because the word "sex" appears in the string of characters. The segmentation engine 120 can be used to determine 18 the operable segmented result for the string of characters "mikesexpress". If the operable segmented result is determined to be "mikes express", then the adult filter can use this information to allow an article identifier for the website "mikesexpress.com" to be included in search result sets.

General

While the above description contains many specifics, these specifics should not be construed as limitations on the scope of the invention, but merely as exemplifications of the disclosed embodiments. Those skilled in the art will envision any other possible variations that are within the scope of the invention. The terms first and second are used herein merely to differentiate one item from another item. The terms first and second are not used to indicate first or second in time, first or second in a list, or other order, unless explicitly noted. For example, the "second" may come in time or in a list before the "first", unless it is otherwise explicitly indicated.

That which is claimed:

1. A computer-implemented method, comprising:
receiving, at a computer system, a string of characters that includes no word-delineating breaks;
generating, by the computer system from the string of characters, a plurality of candidate word groups that are portions of the string of characters;
determining, by the computer system, frequencies with which all or a portion of each of the candidate word groups occur in a corpus; and
selecting, by the computer system using the determined frequencies, one or more of the candidate word groups for submission to an entity, wherein the one or more candidate word groups are selected based on each of the one or more candidate word groups having a determined frequency that is greater than determined frequencies for at least a threshold number of other candidate word groups.

2. The method of claim 1, wherein a frequency with which a candidate word group occurs in the corpus is based upon a combination of frequencies of one or more of the words from the candidate word group in the corpus.

3. The method of claim 2, wherein the combination of frequencies comprises an aggregation of the frequencies of the one or more of the words from the candidate word group in the corpus.

4. The method of claim 2, wherein the combination of frequencies comprises a combination of values produced by a logarithmic function applied to the frequencies of the one or more of the words from the candidate word group in the corpus.

5. The method of claim 1, wherein the string of characters comprises a uniform resource locator (URL).

6. The method of claim 1, wherein a frequency with which a candidate word group occurs in the corpus is determined by submitting all or a portion of the word group to a search engine.

7. The method of claim 1, wherein a frequency with which a candidate word group occurs in the corpus is determined based upon a number of documents in the corpus containing one or more of the words in the candidate word group.

8. The method of claim 1, wherein a frequency with which a candidate word group occurs in the corpus is determined based upon a number of previously received search queries containing one or more of the words in the candidate word group.

9. The method of claim 1, wherein the selected one or more of the candidate word groups have the greatest determined frequencies among the generated candidate word groups.

10. The method of claim 1, wherein the entity comprises a computer device configured to select an advertisement for display in relation to the string of characters based upon the selected one or more of the candidate word groups.

11. The method of claim 1, wherein the entity comprises a computer device configured to use the selected one or more of the candidate word groups in conducting a search related to the string of characters.

12. A computer-implemented method, comprising:
- receiving, at a computer system, a string of characters that includes no word-delineating breaks;
- generating, by the computer system from the string of characters, a plurality of candidate word groups that are portions of the string of characters;
- determining, by the computer system, frequencies with which all or a portion of each of the candidate word groups occur in a corpus; and
- selecting, by the computer system using the determined frequencies, one or more of the candidate word groups for submission to an entity, wherein the entity comprises a computer device configured to use the selected one or more of the candidate word groups in determining whether to apply a filter with regard to the string of characters.

13. The method of claim 1, wherein the entity comprises a data repository configured to store the selected one or more of the candidate word groups in association with the string of characters.

14. The method of claim 1, wherein a candidate word group is generated by inserting one or more word-delineating breaks into the string of characters to form the words of the candidate word group.

15. A computer program product encoded on a tangible and non-transitory computer-readable medium, operable to cause a data processing apparatus to perform operations comprising:
- receiving a string of characters that includes no word-delineating breaks;
- generating, from the string of characters, a plurality of candidate word groups that are portions of the string of characters;
- determining frequencies with which all or a portion of each of the candidate word groups occur in a corpus; and
- selecting, using the determined frequencies, one or more of the candidate word groups for submission to an entity, wherein the one or more candidate word groups are selected based on each of the one or more candidate word groups having a determined frequency that is greater than determined frequencies for at least a threshold number of other candidate word groups.

16. The computer program product of claim 15, wherein a frequency with which a candidate word group occurs in the corpus is based upon a combination of frequencies of one or more of the words from the candidate word group in the corpus.

17. The computer program product of claim 16, wherein the combination of frequencies comprises an aggregation of the frequencies of the one or more of the words from the candidate word group in the corpus.

18. The computer program product of claim 16, wherein the combination of frequencies comprises a combination of values produced by a logarithmic function applied to the frequencies of the one or more of the words from the candidate word group in the corpus.

19. The computer program product of claim 15, wherein the string of characters comprises a uniform resource locator (URL).

20. A system for segmenting a string of characters, the system comprising:
- one or more server devices;
- an interface to the one or more server devices that is configured to receive a string of characters that includes no word-delineating breaks;
- a segmentation processor of the one or more server devices that is configured to from the string of characters, a plurality of candidate word groups that are portions of the string of characters; and
- means for selecting one or more of the combinations of words, wherein the means for selecting is configured to determine frequencies with which all or a portion of each of the candidate word groups occur in a corpus, and wherein the means for selecting is further configured to select, using the determined frequencies, one or more of the candidate word groups for submission to an entity, wherein the one or more candidate word groups are selected based on each of the one or more candidate word groups having a determined frequency that is greater than determined frequencies for at least a threshold number of other candidate word groups.

* * * * *

UNITED STATES PATENT AND TRADEMARK OFFICE
CERTIFICATE OF CORRECTION

| | | |
|---|---|---|
| PATENT NO. | : 8,078,633 B2 | Page 1 of 1 |
| APPLICATION NO. | : 12/724344 | |
| DATED | : December 13, 2011 | |
| INVENTOR(S) | : Gilad Israel Elbaz et al. | |

It is certified that error appears in the above-identified patent and that said Letters Patent is hereby corrected as shown below:

On the Title page, item (*) insert --This patent is subject to a terminal disclaimer--, therefore.

Signed and Sealed this
Seventeenth Day of April, 2012

David J. Kappos
*Director of the United States Patent and Trademark Office*